United States Patent
Miller (10) Patent No.: US 9,258,153 B1
(45) Date of Patent: Feb. 9, 2016

(54) INTER-SYMBOL INTERFERENCE (ISI) LOSS FILTER DEVICE

(71) Applicant: Keysight Technologies, Inc., Minneapolis, MN (US)

(72) Inventor: Kenneston L. Miller, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/556,043

(22) Filed: Nov. 28, 2014

(51) Int. Cl.
H04L 25/03 (2006.01)

(52) U.S. Cl.
CPC .............................. H04L 25/03254 (2013.01)

(58) Field of Classification Search
CPC .. H04B 1/1036; H04B 1/123; H04B 10/2507; H04B 3/04; H04L 27/2647; H04L 2025/03471; H04L 25/03019; H04L 25/03828; H04L 25/03878; H04L 27/0008; H04L 27/3405; H04L 25/03254; H04L 25/03885; H04L 2027/0038; H03H 17/0294; H03H 7/0153; G11B 20/10027; G11B 20/10046; H03G 3/30; H03G 3/3052; H03G 3/3078
USPC .................. 375/229, 230, 232, 316, 346, 348
See application file for complete search history.

(56) References Cited

U.S. PATENT DOCUMENTS

| | | | |
|---|---|---|---|
| 5,625,316 A * | 4/1997 | Chambers et al. ............. | 327/553 |
| 5,642,079 A * | 6/1997 | Whiteside ...................... | 330/260 |
| 6,741,644 B1 | 5/2004 | Dehghan et al. | |
| 7,849,374 B1 | 12/2010 | Necoechea et al. | |
| 8,767,870 B2 | 7/2014 | Waschura et al. | |
| 2002/0064234 A1* | 5/2002 | Kaku ................... | H04B 1/1036 375/285 |
| 2006/0049878 A1* | 3/2006 | Kawabe et al. .................. | 331/16 |
| 2007/0270111 A1* | 11/2007 | Pan ............................. | 455/127.1 |
| 2008/0194221 A1* | 8/2008 | Uramoto et al. ........... | 455/226.1 |

* cited by examiner

*Primary Examiner* — Vineeta Panwalkar (57) ABSTRACT

An inter-symbol interference (ISI) loss filter device emulates frequency dependent losses to an electrical signal. The ISI loss filter device includes amplifier stages connected in series for cascading programmable poles or zeros in a signal path carrying the electrical signal. Each amplifier stage includes a high performance bypass path, a bandwidth limited path parallel to the high performance bypass path, a controllable signal router for routing a variable first and second portions of the electrical signal through the high performance bypass path and the bandwidth limited path, respectively, and a summing junction to combine outputs of the high performance bypass path and the bandwidth limited path for outputting a test signal with high and low frequency content. The high performance bypass path transmits an entire bandwidth of the first portion of the electrical signal, and the bandwidth limited path transmits a controllable limited bandwidth of the second portion of the electrical signal.

18 Claims, 5 Drawing Sheets

INTER-SYMBOL INTERFERENCE (ISI) LOSS FILTER DEVICE

BACKGROUND

High bit rate digital signals are degraded by frequency dependent losses in the signal path, including losses resulting from inter-symbol interference (ISI). Such losses are anticipated and are otherwise normal effects, and must be considered in the design of high bit rate serial transmitters and receivers. For example, an ISI loss filter may be designed to enable a user to apply expected signal path losses to a signal transmitted to a digital receiver, emulating existing or anticipated hardware. The output of the digital receiver may then be checked to determine whether it correctly recovered the digital data, regardless of the applied losses.

A viable ISI filter must operate over a wide frequency range, compensate for internal losses associated with its own design, and be adjustable to match frequency dependent losses expected from printed circuit boards (PCBs), radio frequency (RF) cables, and other circuitry. Conventional ISI filter architecture relies on the general concept that internal parasitic losses in the design must be compensated for using additional amplified signal, leading to designs requiring very high power. This architecture is based on the idea that parasitic losses should be hidden, or bypassed, when high bandwidth operation is needed. Accordingly, there is a need for low power ISI filters.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, according to various embodiments, an inter-symbol interference (ISI) loss filter device for emulating frequency dependent losses to an electrical signal includes multiple amplifier stages connected in series for respectively cascading programmable poles and/or zeros in a signal path carrying the electrical signal. Each amplifier stage includes a high performance bypass path, a bandwidth limited path parallel to the high performance bypass path, a controllable signal router configured to route a variable first portion of the electrical signal through the high performance bypass path and a variable second portion of the electrical signal through the bandwidth limited path, and a summing junction configured to combine outputs of the high performance bypass path and the bandwidth limited path for outputting a test signal with high and low frequency content. The high performance bypass path transmits an entire bandwidth of the first portion of the electrical signal, and the bandwidth limited path transmits a controllable limited bandwidth of the second portion of the electrical signal.

Thus, an ISI loss filter according to various embodiments enables a user to efficiently apply expected signal path losses to a signal transmitted to a digital receiver in order to emulate existing or anticipated hardware. It has been shown that the various embodiments accomplish the performance goals of an ISI loss filter using approximately half the power of the typical conventional ISI filter architecture, mentioned above. For example, for lower bandwidths, internal losses are utilized to accomplish the design goals of the ISI filter, leading to a more power efficient architecture, thus providing a more power efficient, high performance ISI loss filter.

Figure 1:
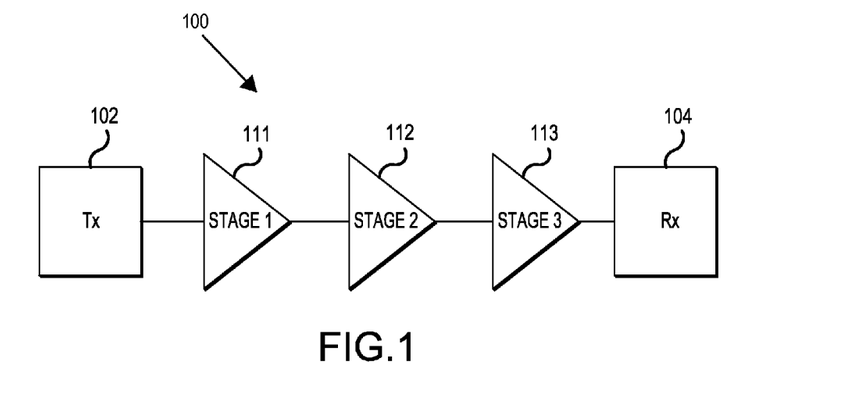
FIG. 1 is a simplified block diagram illustrating an ISI loss filter device, according to a representative embodiment.

FIG. 1 is a simplified block diagram showing an inter-symbol interference (ISI) loss filter device for emulating frequency dependent losses to an electrical signal in a signal path, according to a representative embodiment.

Referring to FIG. 1, ISI loss filter device 100 includes multiple amplifier stages, indicated by representative first amplifier stage 111, second amplifier stage 112 and third amplifier stage 113, connected in series between a transmitter 102 and a receiver 104, which may be a device under test (DUT), for example. Of course, more or fewer than three amplifier stages may be included, without departing from the scope of the present teachings.

The first, second and third amplifier stages 111, 112 and 113 respectively cascade programmable poles in the signal path carrying the electrical signal output by the transmitter 102. That is, each of the first, second and third amplifier stages adds a programmable pole or programmable zero in the signal path. This three-stage cascaded pole architecture helps to emulate a loss profile presented by a real signal channel, such as typical printed circuit board (PCB) and/or coaxial cable losses. Accordingly, the receiver 104, which may be a very high speed RF receiver, for example, can be certified as being able to handle electrical signals under a wide variety of circumstances, including noise conditions.

Figure 2:
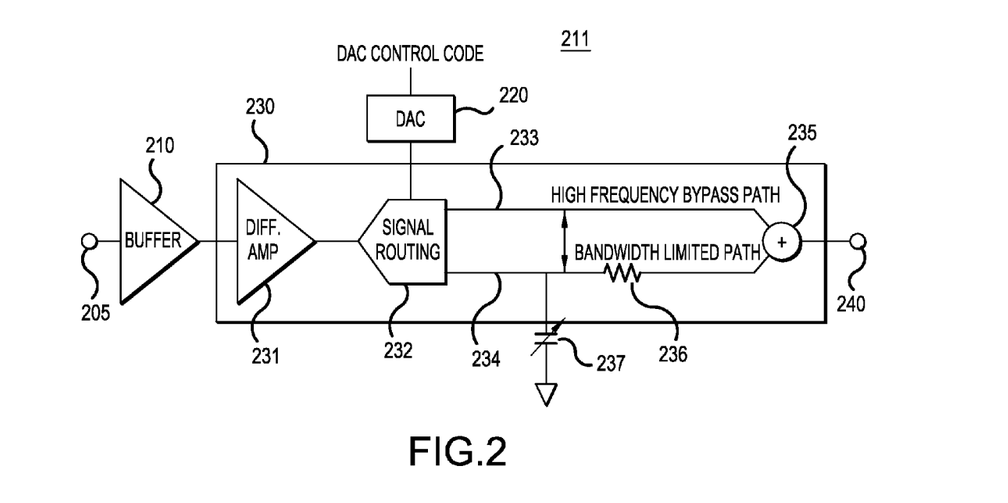
FIG. 2 is a simplified block diagram showing an illustrative amplifier stage in the ISI loss filter device of FIG. 1, according to a representative embodiment.

FIG. 2 is a simplified block diagram showing an illustrative amplifier stage in the ISI loss filter device 100, according to a representative embodiment.

Referring to FIG. 2, amplifier stage 211 includes buffer amplifier 210, digital-to-analog converter (DAC) 220, and routing circuit 230. The buffer amplifier 210 receives the electrical signal output from the transmitter 102 via input port 205, and is configured to increase the drive strength (or amplify) of the received electrical signal. The buffer amplifier 210 in each of the subsequent amplifier stages (e.g., second and third amplifier stages) receives the electrical signal output from the previous, series connected amplifier stage (e.g., first and second amplifier stages, respectively). The DAC 220 controls operation of the routing circuit 230, as discussed below, in response to a DAC control code, discussed below.

The routing circuit 230 includes a differential amplifier 231, a controllable signal router 232, a (very) high performance bypass path 233, a bandwidth limited path 234 connected in parallel to the high performance bypass path 233, and a summing junction 235. The differential amplifier 231 is connected to an output of the buffer amplifier 210 and to an input of the signal router 232, and is configured to provide frequency dependent gain to compensate for parasitic losses in the high performance bypass path 233. That is, the differential amplifier 231 is configured to receive a (differential) input signal from the buffer amplifier 210 and to output an amplified (differential) output signal to the signal router 232 for compensating for parasitic losses. The signal router 232 is configured to receive the amplified electrical signal from the differential amplifier 231, and to route a first portion of the electrical signal through the high performance bypass path 233 and a second portion of the electrical signal through the bandwidth limited path 234. Each of the first and the second portions of the electrical signal provided by the signal router 232 is variable (e.g., under control of the DAC control code received via the DAC 220), and the second portion of the electrical signal, in particular, has a controllable limited bandwidth. Therefore, the electrical signal may be continuously varied, for example, to flow in the bandwidth limited path 234 (with all of its associated parasitic losses) and/or the high performance bypass path 233 using the signal router 232. Notably, the electrical signal may exist entirely in the high performance bypass path 233, or the bandwidth limited path 234, or it may be routed through both the high performance bypass path 233 and the bandwidth limited path 234 simultaneously in any relative proportions, as discussed above.

The high performance bypass path 233 may simply be a wire or conductive trace, for example, with minimized parasitic capacitance. In the depicted embodiment, the bandwidth limited path 234 incorporates a programmable RC network, including a fixed resistance, indicated by resistor 236, and a variable capacitance, indicated by variable capacitor 237. The resistor 236 is connected in series between the controllable signal router 232 and the summing junction 235, and the variable capacitor 237 is connected between the resistor 236 and a ground voltage. The variable capacitor 237 is controlled to provide different capacitance values for varying the controllable limited bandwidth of the second portion of the electrical signal through the bandwidth limited path 234. Accordingly, the high performance bypass path 233 transmits an entire bandwidth of the first portion of the electrical signal, and the bandwidth limited path 234 transmits a controllable limited bandwidth of the second portion of the electrical signal.

Notably, the configuration depicted in FIG. 2 provides a reduction in power required by the amplifier stage(s), as compared to conventional architectures, as mentioned above. For example, conventional architectures are generally based on the concept that parasitic capacitive loading due to bandwidth limiting elements in the bandwidth limited path must be overcome by additional amplified signal. The additional amplified signal is provided by high performance amplifiers coupled into the signal path, which require a great deal of power. In comparison, such high performance amplifiers are not required by the various embodiments, in which the amplifier stages enable parasitic losses to be bypassed (e.g., via the high performance bypass path 233) during high bandwidth operation. Accordingly, the representative amplifier stage 211 (as well as the other amplifier stages), and thus the ISI loss filter device 100, use the same amount of power whether the electrical signal passes through the high performance bypass path 233 or the bandwidth limited path 234 (or any combination thereof).

The summing junction 235 is configured to combine the outputs of the high performance bypass path 233 and the bandwidth limited path 234 for outputting a test signal at output port 240 with high and low frequency content. Low impedance of the summing junction 235 provides isolation between the high performance bypass path 233 and the bandwidth limited path 234.

In various configurations, the variable capacitor 237 may be implemented as a single variable capacitor, or as a variable capacitor array (not shown), such as a binary weighted array, having multiple, independently switchable capacitors for providing the different capacitance values, for example. For example, the variable capacitor 237 may include a binary weighted capacitor array and low impedance switches to provide a wide range of pole frequencies. The value of the capacitance provided by the variable capacitor 237 may be adjusted to emulate different amounts of loss. For example, in the depicted embodiment, the larger the capacitance value of the variable capacitor 237, the greater amount of loss emulated by the bandwidth limited path 234.

The DAC 220 is connected to the signal router 232 for controlling proportions of the first and second portions of the electrical signal passing through the high performance bypass path 233 and the bandwidth limited path 234, respectively, in response to the DAC control code. For example, the DAC control code may be a PCM signal provided by a controller (not shown), although other types of DAC control codes may be implemented without departing from the scope of the present teachings.

The controller may be may be implemented by a computer processor (e.g., of a personal computer (PC) or dedicated workstation), application specific integrated circuits (ASICs), field-programmable gate arrays (FPGAs), or combinations thereof, using software, firmware, hard-wired logic circuits, or combinations thereof. A computer processor, in particular, may be constructed of any combination of hardware, firmware or software architectures, and may include memory (e.g., volatile and/or nonvolatile memory) for storing executable software/firmware executable code that allows it to perform the various functions of determining and communicating the first and portions of the electrical signal to be directed through the high performance bypass path 233 and the bandwidth limited path 234, respectively. In an embodiment, the computer processor may comprise a central processing unit (CPU), for example, executing an operating system. A storage device, such as random access memory (RAM), read-only memory (ROM), flash memory, electrically programmable ROM (EPROM), electrically erasable programmable ROM (EEPROM), hard disk drive (HDD), or the like, may likewise be included for storing appropriate computer readable code. A user interface, such as a graphical user interface (GUI) may also be included for a user to control operations and/or view results corresponding to operations of the ISI loss filter device.

The variable capacitor 237 may be controlled by the same or a different controller than that used to control operation of the signal router 232 to provide different capacitance values. The possible configurations of a capacitor controller would be substantially the same as discussed above with respect to the controller that provides the DAC control codes. Alternatively, the variable capacitor 237 may be controlled manually by the user.

Figure 3:
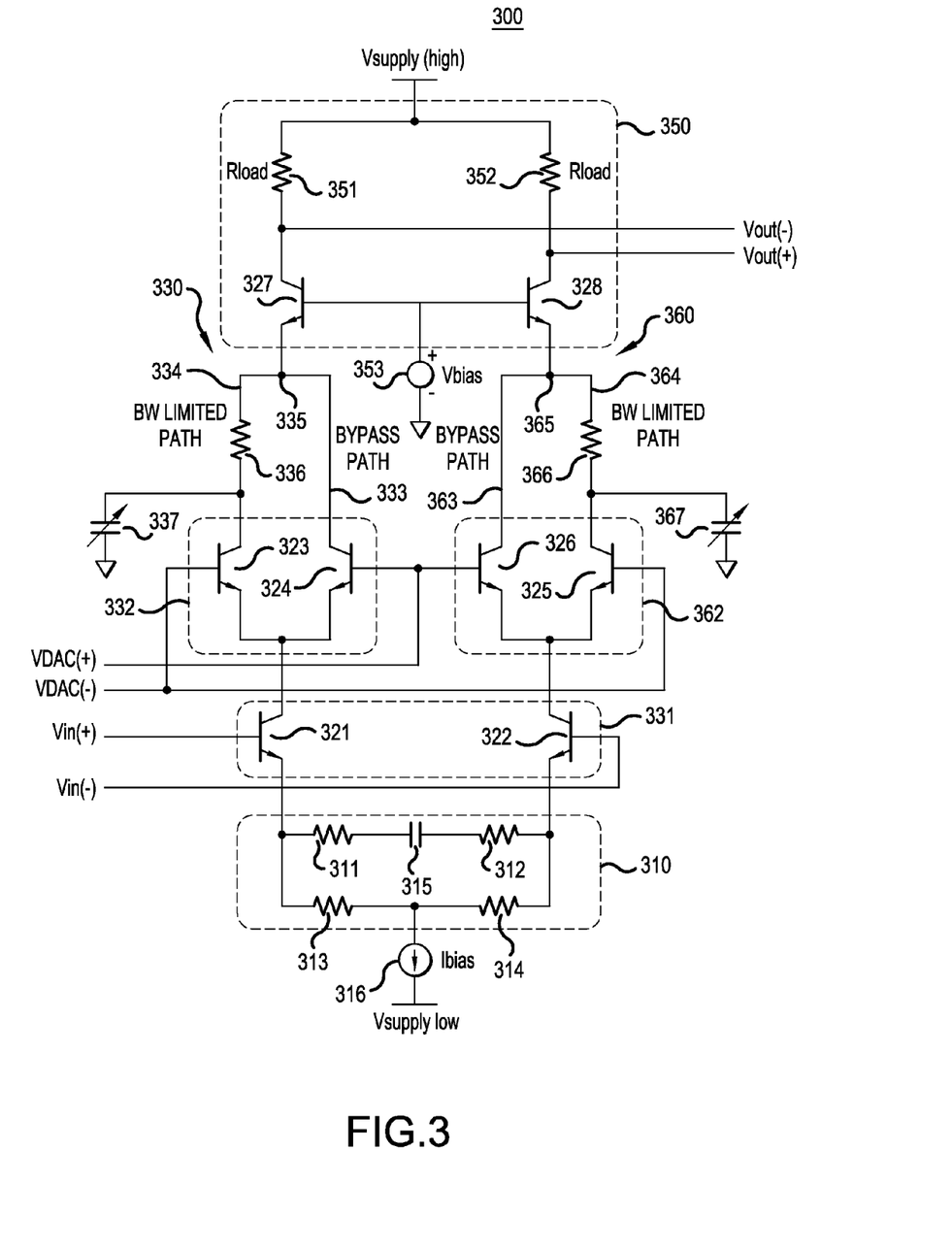
FIG. 3 is a circuit diagram showing an illustrative amplifier stage in the ISI loss filter device of FIG. 1, according to a representative embodiment.

FIG. 3 is a circuit diagram showing an illustrative routing circuit in an amplifier stage circuit of the ISI loss filter device of FIG. 1, according to a representative embodiment.

Referring to FIG. 3, routing circuit 300 is depicted in a differential bipolar implementation based on the differential output of the buffer amplifier (e.g., buffer amplifier 210) (not shown in FIG. 3). Therefore, substantially mirror image signal routers, high performance bypass paths, bandwidth limited paths, and summing junctions are provided, one receiving the electrical signal from the positive voltage output of the buffer amplifier (at Vin(+) of differential amplifier 331), and the other receiving the electrical signal from the negative voltage output of the buffer amplifier (at Vin(−) of the differential amplifier 331). For the sake of discussion, the routing circuits will be referred to as first routing circuit 330 and second routing circuit 360, which correspond to the positive and negative outputs of the buffer amplifier, respectively. The differential amplifier 331 is included in both the first and second routing circuits 330 and 360, although the first routing circuit 330 particularly includes the positive output of the differential amplifier 331, and the second routing circuit 360 includes the negative output of the differential amplifier 331.

The differential amplifier 331 includes first transistor 321 and second transistor 322, which are depicted as bipolar junction transistors (BJTs) for purposes of illustration. However, as would be apparent to one of ordinary skill in the art, the routing circuit 300 may be designed such that the first and second transistors 321 and 322 (as well as some or all of the other transistors depicted in FIG. 3) may be implemented as various alternative types of transistors, such as field effect transistors (FETs), for example, without departing from the scope of the present teachings.

In FIG. 3, the first transistor 321 includes a base corresponding to the positive input (Vin(+)) of the differential amplifier 331, which is connected to the positive output of the buffer amplifier for receiving the electrical signal. The first transistor 321 further includes an emitter connected to a compensation circuit 310, which is configured to compensate for losses on first and second high performance bypass paths 333 and 363 (discussed below), and a collector connected to first signal router 332. The second transistor 322 includes a base corresponding to the negative input (Vin(−)) of the differential amplifier 331, which is connected to the negative output of the buffer amplifier for receiving the electrical signal. The second transistor 322 further includes an emitter connected to the compensation circuit 310 and a collector connected to second signal router 362.

In the first routing circuit 330, the first signal router 332 is configured to route first and second portions of the electrical signal received from the differential amplifier 331 through first high performance bypass path 333 and first bandwidth limited path 334, respectively. The first signal router 332 includes third transistor 323 and fourth transistor 324, which are depicted as BJTs for purposes of illustration. The third transistor 323 includes a base corresponding to a negative input (VDAC(−)) of a DAC (e.g., DAC 220 in FIG. 2) (not shown) for receiving analog control signals. The third transistor 323 further includes an emitter connected to the positive output of the differential amplifier 331 (via the collector the first transistor 321), and a collector connected to the first bandwidth limited path 334. The first bandwidth limited path 334 includes first resistor 336 and first variable capacitor 337, connected between the first resistor 336 and a ground voltage, as discussed above with reference to resistor 236 and variable capacitor 237 in FIG. 2.

The fourth transistor 324 includes a base corresponding to a positive input (VDAC(+)) of the DAC for receiving analog control signals. The fourth transistor 324 further includes an emitter connected to the positive output of the differential amplifier 331 (via the collector the first transistor 321), and a collector connected to the first high performance bypass path 333. The first high performance bypass path 333 and the first bandwidth limited path 334 are combined at first summing junction 335. As discussed above, each of the first and the second portions of the electrical signal provided by the first signal router 332 is variable, and the second portion of the electrical signal, in particular, has a controllable limited bandwidth. Generally, referring to FIG. 3, increased application of VDAC(+) directs a larger proportion of the electrical signal to the first high performance bypass path 333 (increasing the overall bandwidth of the ISI loss filter device) and increased application of VDAC(−) directs a larger proportion of the electrical signal to the first bandwidth limited path 334 (decreasing the overall bandwidth of the ISI loss filter device).

Similarly, in the second routing circuit 360, the second signal router 362 is configured to route first and second portions of the electrical signal received from the differential amplifier 331 through second high performance bypass path 363 and second bandwidth limited path 364, respectively. The second signal router 362 includes fifth transistor 325 and sixth transistor 326, which are depicted as BJTs for purposes of illustration. The fifth transistor 325 includes a base corresponding to the negative input (VDAC(−)) of the DAC for receiving analog control signals. The fifth transistor 325 further includes an emitter connected to the negative output of the differential amplifier 331 (via the collector the second transistor 322), and a collector connected to the second bandwidth limited path 364. The second bandwidth limited path 364 includes second resistor 366 and second variable capacitor 367, connected between the second resistor 366 and a ground voltage, as discussed above with reference to resistor 236 and variable capacitor 237 in FIG. 2. The sixth transistor 326 includes a base corresponding to the positive input (VDAC(+)) of the DAC for receiving analog control signals, where the base of the sixth transistor 326 is connected to the base of the fourth transistor 324. The sixth transistor 326 further includes an emitter connected to the negative output of the differential amplifier 331 (via the collector the second transistor 322), and a collector connected to the second high performance bypass path 363. The second high performance bypass path 363 and the second bandwidth limited path 364 are combined at second summing junction 365. As discussed above, each of the first and the second portions of the electrical signal provided by the second signal router 362 is variable, and the second portion of the electrical signal, in particular, has a controllable limited bandwidth.

The combining of the first high performance bypass path 333 and the first bandwidth limited path 334 at the first summing junction 335, and the combining of the second high performance bypass path 363 and the second bandwidth limited path 364 at the second summing junction 365 is enabled by summing circuit 350. In the depicted embodiment, the summing circuit 350 includes seventh transistor 327, eighth transistor 328, as well as load resistors 351 and 352. The seventh transistor 327 includes a base connected to bias voltage source 353 (connected to ground), and an emitter connected to the first summing junction 335. The seventh transistor 327 further includes a collector directly connected to an output for providing negative output voltage Vout(−) of the routing circuit 300, and also connected to supply voltage source Vsupply (high) via the load resistor 351. Similarly, the eighth transistor 328 includes a base connected to the bias voltage source 353 and to the base of the seventh transistor 327, and an emitter connected to the second summing junction 365. The eighth transistor 328 further includes a collector directly connected to an output for providing positive output voltage Vout(+) of the routing circuit 300, and also connected to the supply voltage source Vsupply via the load resistor 352.

The summing circuit 350 exhibits low impedance at its first emitter input compared to the first resistor 336 in the first bandwidth limited path 334 of the first summing junction 335. Likewise, the summing circuit 350 exhibits low impedance at its second emitter input compared to the second resistor 366 in the second bandwidth limited path 364 of the second summing junction 365. This means that nearly all of the current directed through the first and second high performance bypass paths 333 and 363 flows into the seventh and eighth (summing) transistors 327 and 328, respectively. Accordingly, the high frequency performance of the first and second high performance bypass paths 333 and 363 are preserved. That is, if the impedance of the summing circuit 350 were comparatively high, the electronic signals on the first and second high performance bypass paths 333 and 363 would "see" the loading of the first and second bandwidth limited paths 334 and 364, respectively, and thus be bandwidth limited. However, according to the various embodiments, the current is steered away from parasitic loading in the first and second bandwidth limited paths 334 and 364.

As mentioned above, the routing circuit 300 includes the compensation circuit 310 to compensate for losses on first high performance bypass path 333 and the second high performance bypass path 363. In the depicted embodiment, the compensation circuit 310 includes compensation resistors 311 and 312, emitter degeneration resistors 313 and 314, and compensation capacitor 315. In particular, the compensation resistor 311, the compensation capacitor 313 and the compensation resistor 312 are connected in series with one another between the emitter of the first transistor 321 and the emitter of the second transistor 322 in the differential amplifier 331. The emitter degeneration resistor 313 is connected between the emitter of the first transistor 321 and bias current source 316 (connected to supply voltage Vsupply (low)), and the emitter degeneration resistor 314 is connected between the emitter of the second transistor 322 and the bias current source 316. The emitter degeneration resistors 313 and 314 generally moderate gain and increase the linear voltage range of the corresponding first and second transistors 321 and 322, respectively.

With regard to the compensation circuit 310, the gain of the differential amplifier 331, at least to first order, is related to the ratio of the output load impedance divided by the impedance between the emitters of the first and second transistors 321 and 322. Even with fairly good isolation at the first and second summing junctions 335 and 365, a small amount of AC current may be diverted into the first and second bandwidth limited paths 334 and 364, because the impedance on the emitters of the seventh and eighth transistors 327 and 328 is not quite zero. At high frequencies, this condition may worsen, as the impedances looking into the first and second variable capacitors 337 and 367 decrease. To compensate, the gain of the differential amplifier 331 may be increased over frequency to match the reduction in gain (or attenuation) over frequency. The gain is increased by correspondingly decreasing the impedance between the emitters of the first and second transistors 321 and 322 using an RC filter (e.g., comprising compensation resistors 311, 312, emitter degeneration resistors 313 and 314, and capacitor 315) as frequency increases.

Current steering may be used above the differential amplifier 331 to continuously vary the proportion of the electrical signal between the first and second bandwidth limited paths 334, 364 and the first and second high performance bypass paths 333, 363, respectively. For example, the first and second portions of the electrical signal from the first bandwidth limited path 334 and the first high performance bypass path 333 are summed together at the low impedance emitter of seventh transistor 327. Accordingly, a constant bias current is maintained in the seventh transistor 327, regardless of the current steering, keeping the seventh transistor 327 emitter input impedance relatively constant. This makes it easier to keep the seventh transistor 327 stable over a wide frequency range and substantially cancels self-heating thermal error generated by third and fourth transistors 323 and 324 in the first signal router 332. Likewise, the first and second portions of the electrical signal from the second bandwidth limited path 364 and the second high performance bypass path 363 are summed together at the low impedance emitter of eight transistor 328, thereby maintaining a constant bias current in the eighth transistor 328, regardless of the current steering, keeping the eighth transistor 328 emitter input impedance relatively constant. Again, this makes it easier to keep the eighth transistor 328 stable over a wide frequency range and substantially cancels self-heating thermal error generated by fifth and sixth transistors 325 and 326 in the second signal router 362.

Each of the first and second high performance bypass paths 333 and 363 is largely isolated from the parasitic capacitance of the corresponding first and second bandwidth limited paths 334 and 364 by the low emitter resistance of the seventh and eighth transistors 327 and 328, and by relatively large values of the first and second resistors 336 and 366, respectively. However, since the emitter input impedance of each of the seventh and eighth transistors 327 and 328 is not quite zero, the gain boosting compensation circuit 310 on the emitters of the first and second transistors 321 and 322 (differential pair) is added to compensate for residual loading.

Figure 4:
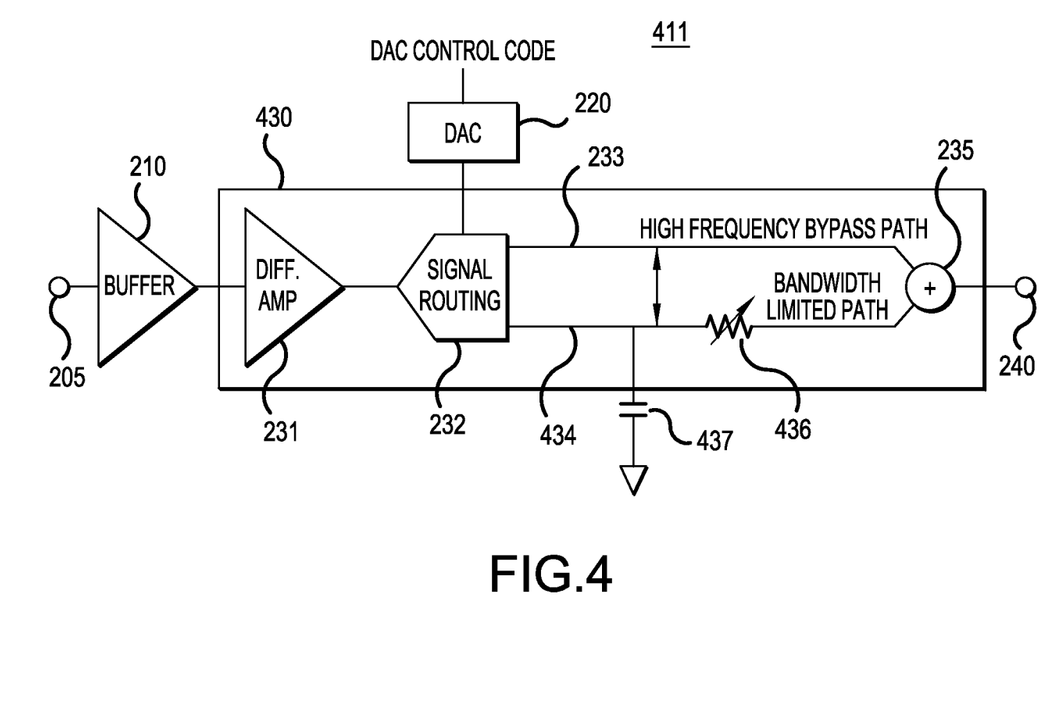
FIG. 4 is a simplified block diagram showing an illustrative amplifier stage in the ISI loss filter device of FIG. 1, according to another representative embodiment.

FIG. 4 is a simplified block diagram showing an illustrative amplifier stage in the ISI loss filter device 100, according to another representative embodiment.

Referring to FIG. 4, amplifier stage 411 includes input port 205, buffer amplifier 210, DAC 220 and output port 240, which are substantially the same as discussed above with reference to FIG. 2. The amplifier stage 411 further includes routing circuit 430, which is similar to the routing circuit 230 in FIG. 2, except for configuration of the bandwidth limited path, as discussed below.

More particularly, the routing circuit 430 includes differential amplifier 231, a controllable signal router 232, (very) high performance bypass path 233, a bandwidth limited path 434 connected in parallel to the high performance bypass path 233, and summing junction 235. The signal router 232 is configured to receive an amplified electrical signal from the differential amplifier 231, and to route a first portion of the electrical signal through the high performance bypass path 233 and a second portion of the electrical signal through the bandwidth limited path 434. As discussed above, each of the first and the second portions of the electrical signal provided by the signal router 232 is variable, and the second portion of the electrical signal, in particular, has a controllable limited bandwidth. Therefore, the electrical signal may be continuously varied, for example, to flow in the bandwidth limited path 434 and/or the high performance bypass path 233 using the signal router 232. Notably, the electrical signal may exist entirely in the high performance bypass path 233, or the bandwidth limited path 434, or it may be routed through both the high performance bypass path 233 and the bandwidth limited path 434 simultaneously in any relative proportions, as discussed above.

In the depicted embodiment, the bandwidth limited path 434 incorporates a programmable RC network, including a variable resistance, indicated by variable resistor 436, and a fixed capacitance, indicated by capacitor 437. The RC network of the routing circuit 430 thus differs from the RC network of the routing circuit 230 in that the resistance value is variable as opposed to the capacitance value, but otherwise the purpose of being able to adjust the bandwidth of the bandwidth limited path 434 is the same. The variable resistor 436 is connected in series between the controllable signal router 232 and the summing junction 235, and the capacitor 437 is connected between the variable resistor 436 and a ground voltage. The variable resistor 436 is controlled to provide different resistance values for varying the controllable limited bandwidth of the second portion of the electrical signal through the bandwidth limited path 434. Accordingly, the high performance bypass path 233 transmits an entire bandwidth of the first portion of the electrical signal, and the bandwidth limited path 434 transmits a controllable limited bandwidth of the second portion of the electrical signal. The summing junction 235 is configured to combine the outputs of the high performance bypass path 233 and the bandwidth limited path 434 for outputting a test signal at output port 240 with high and low frequency content, as discussed above.

Figure 5:
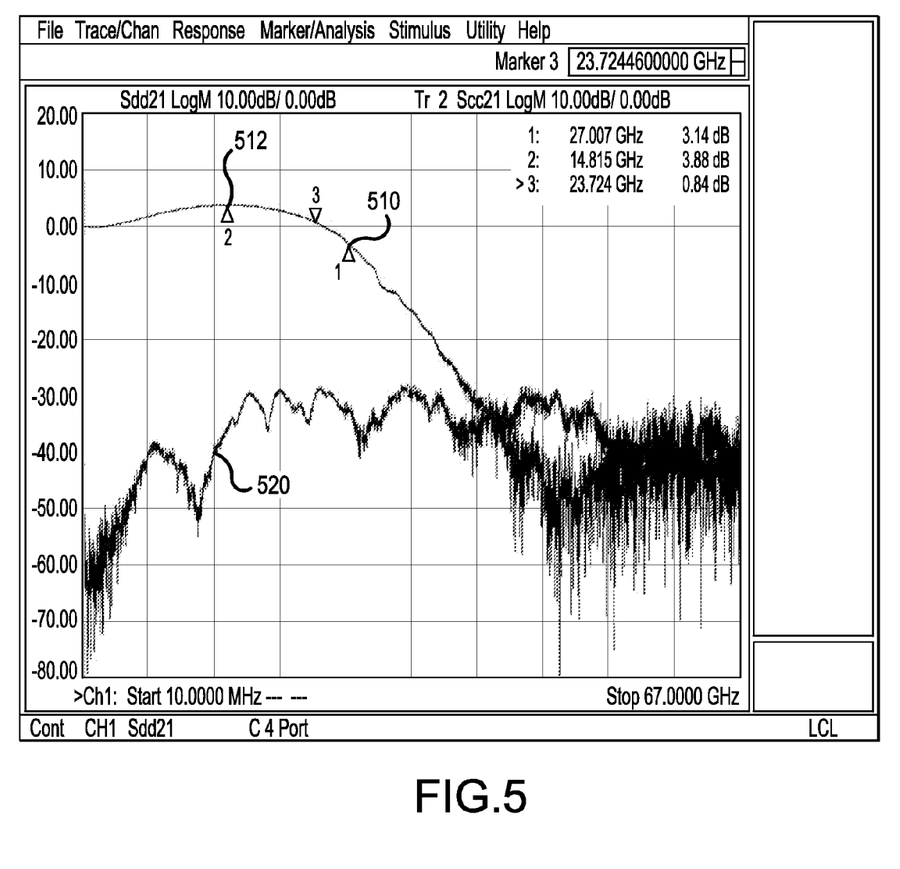
FIGS. 5 and 6 are displayed measurement results of outputs of an ISI loss filter device with multiple amplifier stages, according to representative embodiments.
Figure 6:
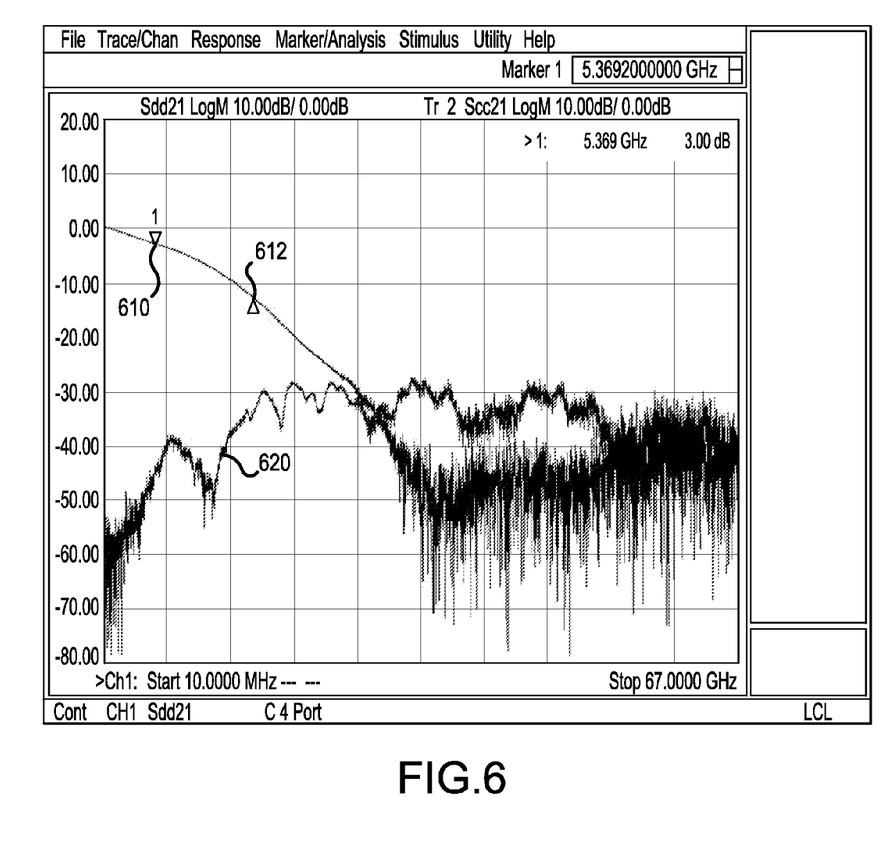

FIGS. 5 and 6 are displayed measurement results of outputs of an ISI loss filter device with multiple amplifier stages, according to representative embodiments. The displays show power (in dB) versus frequency (in GHz). FIG. 5 shows the differential and common mode gain characteristics of an amplifier stage with the electrical signal routed through the high performance bypass path (e.g., high performance bypass path 233). In particular, the differential gain is much higher near reference number 512 than near reference number 612 on the same plot in FIG. 6, where the signal is routed through the bandwidth limited path (e.g., bandwidth limited path 234). Notably, the variable capacitor is set to minimum in FIG. 6, so this is just the performance benefit due to switching the electrical signal back and forth between the high performance bypass path 233 and bandwidth limited path 234. If the capacitance were further increased in the variable capacitor, the gain in FIG. 6 would drop even further.

Referring to FIG. 5, the ISI filter device includes three amplifier stages (e.g., amplifier stage 211), where the corresponding signal routers (e.g., signal router 232) are controlled such that entire electrical signal passes through the high performance bypass paths (e.g., high performance bypass path 233). The resulting bandwidth is about 27 GHz, indicated by reference number 510. Referring to FIG. 6, in the three amplifier stages of the ISI filter device, the corresponding signal routers are controlled such that entire electrical signal passes through the bandwidth limited path (e.g., bandwidth limited path 234). The resulting bandwidth is about 5.369 GHz, indicated by reference number 610. The different bandwidths imply different amounts of attenuation in the ISI filter over different frequencies. A lower bandwidth would correspond to an electrical signal that has experienced more loss. The bottom trace 520, 620 in FIGS. 5 and 6 shows the common mode gain of the circuit.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

The invention claimed is:

1. An inter-symbol interference (ISI) loss filter device for emulating frequency dependent losses to an electrical signal, the ISI loss filter device comprising:
   a plurality of amplifier stages connected in series for respectively cascading programmable poles or zeros in a signal path carrying the electrical signal, wherein each amplifier stage comprises:
   a high performance bypass path;
   a bandwidth limited path parallel to the high performance bypass path;
   a controllable signal router configured to route a variable first portion of the electrical signal through the high performance bypass path and a variable second portion of the electrical signal through the bandwidth limited path; and
   a summing junction configured to combine outputs of the high performance bypass path and the bandwidth limited path for outputting a test signal with high and low frequency content,
   wherein the high performance bypass path transmits an entire bandwidth of the variable first portion of the electrical signal, and the bandwidth limited path transmits a controllable limited bandwidth of the variable second portion of the electrical signal.

2. The ISI loss filter device of claim 1, wherein the bandwidth limited path comprises:
   a resistance connected in series between the controllable signal router and the summing junction; and
   a variable capacitance connected between the resistance and a ground voltage, the variable capacitance being controlled to provide different capacitance values for varying the controllable limited bandwidth of the variable second portion of the electrical signal.

3. The ISI loss filter device of claim 2, wherein the variable capacitance comprises a variable capacitor array having a plurality of independently switchable capacitors for providing the different capacitance values.

4. The ISI loss filter device of claim 2, wherein each amplifier stage further comprises:
   a buffer amplifier configured to increase the drive strength of the electrical signal.

5. The ISI loss filter device of claim 4, wherein each amplifier stage further comprises:
   a differential amplifier connected to an output of the buffer amplifier and an input of the controllable signal router, the differential amplifier being configured to provide frequency dependent gain for compensating for parasitic losses in the high performance bypass path.

6. The ISI loss filter device of claim 2, wherein each amplifier stage further comprises:
   a digital to analog converter (DAC) connected to the controllable signal router for controlling proportions of the variable first and second portions of the electrical signal passing through the high performance bypass path and the bandwidth limited path, respectively, in response to the DAC control code.

7. The ISI loss filter device of claim 1, wherein the bandwidth limited path comprises:
   a variable resistance connected in series between the controllable signal router and the summing junction, the variable resistance being controlled to provide different resistance values for varying the controllable limited bandwidth of the variable second portion of the electrical signal; and
   a capacitance connected between the variable resistance and a ground voltage.

8. An amplifier stage circuit for adding one or more programmable poles or zeros in a signal path, including additional series connected amplifier stage circuits, the amplifier stage circuit comprising:
- a differential amplifier connected configured to receive an input signal and to output an amplified output signal for compensating for parasitic losses;
- a signal router configured to proportion the amplified output signal into a variable first portion and a variable second portion in response to a control signal;
- a high performance bypass path configured to receive the variable first portion of the amplified output signal from the signal router, and to transmit an entire bandwidth of the variable first portion;
- a bandwidth limited path configured to receive the variable second portion of the amplified output signal from the signal router, and to transmit a controllable limited bandwidth of the variable second portion; and
- a summing junction configured to combine outputs of the high performance bypass path and the bandwidth limited path for outputting a test signal with high and low frequency content.

9. The amplifier stage circuit of claim 8, wherein the differential amplifier provides frequency dependent gain in the high performance bypass path.

10. The amplifier stage circuit of claim 8, wherein the bandwidth limited path comprises:
- a resistance connected in series between the signal router and the summing junction; and
- a variable capacitance connected between the resistance and a ground voltage, the variable capacitance being controlled to provide different capacitance values for varying the controllable limited bandwidth of the variable second portion of the electrical signal.

11. The amplifier stage circuit of claim 10, wherein the variable capacitance comprises a variable capacitor array having a plurality of independently switchable capacitors for providing the different capacitance values.

12. The amplifier stage circuit of claim 8, further comprising:
- a buffer amplifier configured to amplify a received electrical signal, and to output the amplified electrical signal as the input signal to the differential amplifier, the buffer amplifier increasing drive strength of the received electrical signal.

13. A routing circuit of an amplifier stage in an intersymbol interference (ISI) loss filter device including additional series connected amplifier stages, the routing circuit comprising:
- a differential amplifier connected configured to receive a differential input signal and to output an amplified differential output signal for compensating for parasitic losses;
- a plurality of signal routers configured to proportion the amplified differential output signal into variable first portions and variable second portions in response to a control signal;
- a plurality of high performance bypass paths configured to receive the variable first portions of the amplified differential output signal from the signal routers, respectively, and to transmit entire bandwidths of the variable first portions;
- a plurality of corresponding bandwidth limited paths configured to receive the variable second portions of the amplified differential output signal from the signal routers, respectively, and to transmit controllable limited bandwidths of the variable second portions; and
- a plurality of summing junctions configured to combine outputs of the high performance bypass paths and the corresponding bandwidth limited paths, respectively, for outputting test signals with high and low frequency content.

14. The amplifier stage circuit of claim 13, wherein the differential amplifier comprises:
- a first transistor comprising a first base for receiving positive voltage of the differential input signal, a first emitter connected to a compensation circuit for compensating for the parasitic losses in the high performance bypass path, and a first collector connected to a first routing circuit comprising a first signal router, a first high performance bypass paths, a first bandwidth limited path and a first summing junction; and
- a second transistor comprising a second base for receiving negative voltage of the input signal, a second emitter connected to the compensation circuit, and a second collector connected to a second routing circuit comprising a second signal router, a second high performance bypass path, a second bandwidth limited path and a second summing junction.

15. The amplifier stage circuit of claim 14, wherein the first signal router comprises:
- a third transistor comprising a third base for receiving negative voltage of the control signal, a third emitter connected to the first collector of the first transistor of the differential amplifier, and a third collector connected to a first variable capacitor and a first resistor in the first bandwidth limited path; and
- a fourth transistor comprising a fourth base for receiving positive voltage of the control signal, a fourth emitter connected to the first collector of the first transistor of the differential amplifier, and a fourth collector connected to the first high performance bypass path.

16. The amplifier stage circuit of claim 15, wherein the second signal router comprises:
- a fifth transistor comprising a fifth base for receiving the negative voltage of the control signal, fifth emitter connected to the second collector of the second transistor of the differential amplifier, and a fifth collector connected to a second variable capacitor and a second resistor in the second bandwidth limited path; and
- a sixth transistor comprising a sixth base for receiving the positive voltage of the control signal, a sixth emitter connected to the second collector of the second transistor of the differential amplifier, and a sixth collector connected to the second high performance bypass path.

17. The amplifier stage circuit of claim 16, further comprising a summing circuit connected to the first and second summing junctions, the summing circuit comprising:
- a seventh transistor comprising a seventh base connected to a bias voltage, a seventh emitter connected to the first summing junction, and a seventh collector connected to a supply voltage source via a first load resistance and to a first output for outputting negative voltage of the test signal; and
- an eighth transistor comprising an eighth base connected to the bias voltage, an eighth emitter connected to the second summing junction, and an eighth collector connected to the supply voltage source via a second load resistance and to a second output for outputting positive voltage of the test signal.

18. The amplifier stage circuit of claim 17, wherein the bias voltage maintains a constant bias current in each of the seventh and eighth transistors, keeping input impedance of the emitter in each of the seventh and eighth transistors relatively constant.

* * * * *